United States Patent
Yoshida

(10) Patent No.: US 12,534,667 B2
(45) Date of Patent: Jan. 27, 2026

(54) FLUORIDE PHOSPHOR, PRODUCTION METHOD THEREFOR, AND LIGHT-EMITTING DEVICE

(71) Applicant: NICHIA CORPORATION, Anan (JP)

(72) Inventor: Tomokazu Yoshida, Anan (JP)

(73) Assignee: NICHIA CORPORATION, Anan (JP)

( * ) Notice: Subject to any disclaimer, the term of this patent is extended or adjusted under 35 U.S.C. 154(b) by 732 days.

(21) Appl. No.: 17/932,881

(22) Filed: Sep. 16, 2022

(65) Prior Publication Data

US 2023/0114859 A1   Apr. 13, 2023

(30) Foreign Application Priority Data

Oct. 13, 2021 (JP) .................. 2021-168249
Dec. 13, 2021 (JP) .................. 2021-201557

(51) Int. Cl.
| | |
|---|---|
| C09K 11/61 | (2006.01) |
| C09K 11/62 | (2006.01) |
| C09K 11/66 | (2006.01) |
| C09K 11/77 | (2006.01) |
| H10H 20/851 | (2025.01) |

(52) U.S. Cl.
CPC .......... *C09K 11/617* (2013.01); *C09K 11/621* (2013.01); *C09K 11/665* (2013.01); *C09K 11/77342* (2021.01); *C09K 11/77346* (2021.01); *C09K 11/77348* (2021.01); *C09K 11/7774* (2013.01); *C09K 11/77747* (2021.01); *H10H 20/8512* (2025.01); *H10H 20/8513* (2025.01)

(58) Field of Classification Search
CPC ............ C09K 11/617; C09K 11/77348; C09K 11/77342; C09K 11/77346; C09K 11/774; C09K 11/77747; C09K 11/621; C09K 11/665; H10H 20/8513; H10H 20/8512
See application file for complete search history.

(56) References Cited

U.S. PATENT DOCUMENTS

| | | | |
|---|---|---|---|
| 8,057,706 B1 * | 11/2011 | Setlur ................. | C09K 11/675 252/301.4 F |
| 2012/0256125 A1 | 10/2012 | Kaneyoshi et al. | |
| 2013/0264937 A1 | 10/2013 | Sakuta et al. | |
| 2015/0263245 A1 | 9/2015 | Akagawa et al. | |

(Continued)

FOREIGN PATENT DOCUMENTS

| | | |
|---|---|---|
| JP | 2011012091 A | 1/2011 |
| JP | 2012104814 A | 5/2012 |

(Continued)

*Primary Examiner* — C Melissa Koslow
(74) *Attorney, Agent, or Firm* — Hunton Andrews Kurth LLP

(57) ABSTRACT

Provided is a fluoride phosphor having higher durability. The fluoride phosphor includes a first fluoride and a second fluoride deposited on at least part of a surface of the first fluoride. The first fluoride has a composition containing an alkali metal, Si, Al, Mn, and F, wherein, when the number of moles of the alkali metal is taken as 2, the total number of moles of Si, Al, and Mn is 0.9 to 1.1; the number of moles of Al is more than 0 and less than 0.10; the number of moles of Mn is more than 0 and less than 0.20; and the number of moles of F is 5.9 to 6.1. The second fluoride has a composition which contains an alkali metal, Si, and F, and which is substantially free of Al and Mn.

16 Claims, 2 Drawing Sheets

(56) References Cited

U.S. PATENT DOCUMENTS

2016/0111610 A1* 4/2016 Ota .................. H01L 21/02601
252/301.36
2016/0160122 A1* 6/2016 You ..................... C09K 11/025
252/301.36

FOREIGN PATENT DOCUMENTS

| JP | 2012224536 A | 11/2012 |
| JP | 2015188075 A | 10/2015 |
| JP | 2016082212 A | 5/2016 |
| JP | 2017052935 A | 3/2017 |
| WO | 2012050199 A1 | 4/2012 |
| WO | 2022138205 A1 | 6/2022 |

* cited by examiner 218,249, filed on Oct. 13, 2021, and Japa-

FLUORIDE PHOSPHOR, PRODUCTION METHOD THEREFOR, AND LIGHT-EMITTING DEVICE

This application claims priority to Japanese Patent Application No. 2021-168249, filed on Oct. 13, 2021, and Japanese Patent Application No. 2021-201557, filed on Dec. 13, 2021, the disclosures of which are hereby incorporated by reference in their entirety.

BACKGROUND

Field of the Invention

The present disclosure relates to a fluoride phosphor, a production method therefor, and a light-emitting device.

Description of the Related Art

A variety of light-emitting devices including combinations of a light-emitting element and a phosphor have been developed, and are used in a wide range of fields such as lighting, in-vehicle lighting, displays, and backlights for liquid crystal. A phosphor used in a light-emitting device to be used for a backlight of liquid crystal is required to have, for example, high color purity, that is, an emission peak having a narrow half-width. As a red-emitting phosphor showing an emission peak having a narrow half-width, for example, a fluoride phosphor having the composition represented by $K_2SiF_6$:Mn is disclosed in JP 2012-224536 A.

SUMMARY

A first exemplary embodiment is a fluoride phosphor including a first fluoride and a second fluoride deposited on at least part of a surface of the first fluoride. The first fluoride has a composition containing an alkali metal, Si, Al, Mn, and F, wherein, when a number of moles of the alkali metal is taken as 2, a total number of moles of Si, Al, and Mn is 0.9 to 1.1; a number of moles of Al is more than 0 and less than 0.10; a number of moles of Mn is more than 0 and less than 0.20; and a number of moles of F is 5.9 to 6.1. The second fluoride has a composition which contains an alkali metal, Si, and F, and which is substantially free of Al and Mn.

A second exemplary embodiment is a light-emitting device including a first luminescent material containing the fluoride phosphor according to the first exemplary embodiment; and a light-emitting element that radiates light to the first luminescent material.

A third exemplary embodiment is a method of producing a fluoride phosphor. The method includes providing a first fluoride having a composition containing an alkali metal, Si, Al, Mn, and F, wherein, when the number of moles of the alkali metal is taken as 2, the total number of moles of Si, Al, and Mn is 0.9 to 1.1; the number of moles of Al is more than 0 and less than 0.10; the number of moles of Mn is more than 0 and less than 0.20; and a number of moles of F is 5.9 to 6.1; and bringing the first fluoride, a first solution containing Si and F, and a second solution containing an alkali metal into contact with each other in the presence of a reducing agent to deposit, on at least part of a surface of the first fluoride, a second fluoride having a composition which contains an alkali metal, Si, and F, and which is substantially free of Al and Mn, to obtain a complex fluoride.

DETAILED DESCRIPTION

Figure 1:
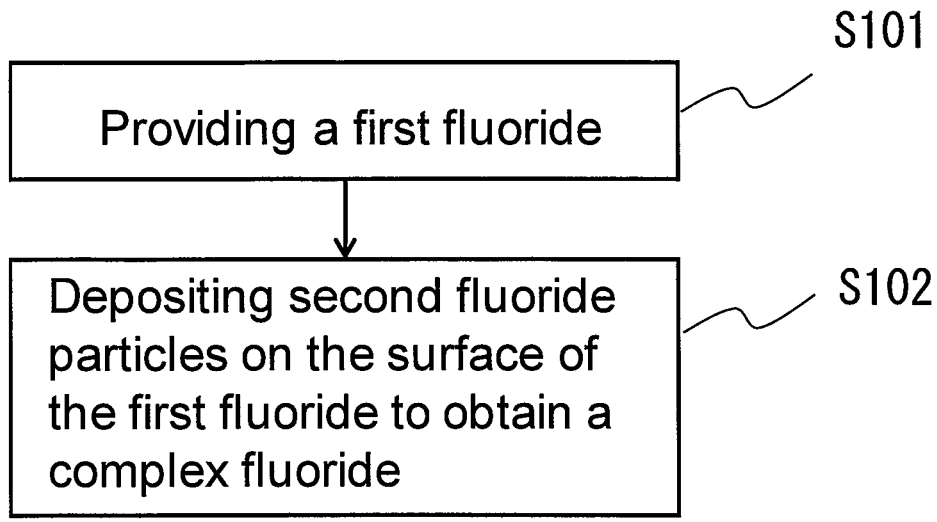
FIG. 1 is an exemplary flow chart illustrating an exemplary method of producing a fluoride phosphor.

In the present description, the term "step" includes not only an independent step, but also a step indistinguishable from another step as long as the desired purpose of the step can be achieved. Unless otherwise specified, when a plurality of substances corresponding to a certain component is present in a composition, the content of the component in the composition means the total amount of the plurality of substances present in the composition. The upper limit and lower limit of a numerical range described in the present description may be a combination of arbitrarily selected values exemplified as the numerical range. In the present description, the relationship between color names and chromaticity coordinates, the relationship between light wavelength ranges and names of monochromatic lights, and the like are defined according to JIS Z8110. The half-width of a phosphor means the wavelength width of the emission spectrum of the phosphor at which the emission intensity is 50% relative to the maximum emission intensity (full width at half maximum; FWHM). In each formula representing the composition of a phosphor or a luminescent material in the present description, when a plurality of elements are separated by commas (,), it means that at least one of these plurality of elements is contained in the composition. In each formula representing the composition of a phosphor, a host crystal is described before a colon (:), and an activator element is described after the colon. Embodiments of the present invention are described below in detail. The embodiments described below, however, are merely examples of the fluoride phosphor, the production method therefor, and the light-emitting device for realization of the technological thought of the present invention. Therefore, the present invention is not limited to the fluoride phosphor, the production method therefor, and the light-emitting device described below.

Fluoride Phosphor

The fluoride phosphor may include a first fluoride, and a second fluoride deposited on at least part of a surface of the first fluoride. The first fluoride has a composition containing an alkali metal, Si, Al, Mn, and F, wherein, when the number of moles of the alkali metal is taken as 2, the total number of moles of Si, Al, and Mn is 0.9 to 1.1; the number of moles of Al is more than 0 and less than 0.10; the number of moles of Mn is more than 0 and less than 0.20; and the number of moles of F is 5.9 to 6.1. The second fluoride may have a composition which contains an alkali metal, Si, and F, and which is substantially free of Al and Mn.

Since the second fluoride is deposited on the surface of the first fluoride, the fluoride phosphor may exhibit higher durability. This may be thought to be due to, for example, the following reason. The second fluoride deposited on the surface of the first fluoride has a composition containing an alkali metal, Si, and F. However, the composition is substantially free of Al and Mn, whose difference in the ion radius may change the crystal structure. Therefore, the crystal structure as the fluoride phosphor may be stabilized.

The alkali metal(s) in the composition of the fluoride phosphor, the alkali metal(s) in the composition of the first fluoride, and/or the alkali metal(s) in the composition of the second fluoride may contain, independently, at least one selected from the group consisting of lithium (Li), sodium (Na), potassium (K), rubidium (Rb), and cesium (Cs), or may contain, independently, at least potassium (K), and at least one selected from the group consisting of lithium (Li), sodium (Na), rubidium (Rb), and cesium (Cs). The alkali metal(s) in the composition of the first fluoride and the alkali metal(s) in the composition of the second fluoride may substantially consist of potassium (K). The term "substantially consist of K" herein means that the ratio of the number of moles of K to the total number of moles of the alkali metal(s) contained in the composition may be, for example, not less than 0.90, or may be preferably not less than 0.95 or not less than 0.97. Regarding the upper limit, the ratio of the number of moles may be not more than 1 or 0.995. In the fluoride phosphor, the first fluoride, and/or the second fluoride, part of the alkali metal(s) may be replaced by ammonium ions ($NH_4^+$). In cases where part of the alkali metal(s) is replaced by ammonium ions, the ratio of the number of moles of the ammonium ions to the total number of moles of the alkali metal(s) in the composition may be, for example, not more than 0.10, preferably not more than 0.05, or not more than 0.03. Regarding the lower limit, the ratio of the number of moles of the ammonium ions may be more than 0, or may be preferably not less than 0.005.

The first fluoride may have, for example, the following composition. The ratio of the total number of moles of Si, Al, and Mn to the total number of moles of the alkali metal(s), when the latter is taken as 2, may be, for example, not less than 0.9 or not more than 1.1. The ratio may be preferably not less than 0.95 or not less than 0.97, and may be preferably not more than 1.05 or not more than 1.03. The ratio of the number of moles of Al to the total number of moles of the alkali metal(s), when the latter is taken as 2, may be, for example, more than 0 and not more than 0.1. The ratio may be preferably not less than 0.002 or not less than 0.003, and may be preferably not more than 0.03, not more than 0.02, or not more than 0.015. The ratio of the number of moles of Mn to the total number of moles of the alkali metal(s), when the latter is taken as 2, may be, for example, more than 0 and not more than 0.2. The ratio may be preferably not less than 0.005, not less than 0.01, or not less than 0.015, and may be preferably not more than 0.15, not more than 0.12, or not more than 0.1. The ratio of the number of moles of F to the total number of moles of the alkali metal(s), when the latter is taken as 2, may be, for example, not less than 5.9 or not more than 6.1. The ratio may be preferably not less than 5.92 or not less than 5.95, and may be preferably not more than 6.05 or not more than 6.025. The ratio of the number of moles of Si to the total number of moles of the alkali metal(s), when the latter is taken as 2, may be, for example, not less than 0.7 or not more than 1.1. The ratio may be preferably not less than 0.8, not less than 0.85, or not less than 0.92, and may be preferably not more than 1.03, not more than 1.01, or less than 0.95. In the composition of the first fluoride, the ratio of the number of moles of Al to the number of moles of Si, may be, for example, not less than 0.001 or not more than 0.14. The ratio may be preferably not less than 0.002 or not less than 0.003, and may be preferably not more than 0.04 or not more than 0.015.

The first fluoride may have, for example, a composition represented by the following Formula (Ia).

$$M^1{}_2[Si_pAl_qMn_rF_s] \quad \text{(Ia)}$$

In Formula (Ia), $M^1$ represents an alkali metal which may include at least K. Mn may be a tetravalent Mn ion. p, q, r, and s may satisfy 0.9≤p+q+r≤1.1, 0<q≤0.1, 0<r≤0.2, and 5.9≤s≤6.1. p, q, r, and s may preferably satisfy 0.95≤p+q+r≤1.05 or 0.97≤p+q+r≤1.03; 0<q≤0.03, 0.002≤q≤0.02, or 0.003≤q≤0.015; 0.005≤r≤0.15, 0.01≤r≤0.12, or 0.015≤r≤0.1; and 5.92≤s≤6.05 or 5.95≤s≤6.025.

The second fluoride may have, for example, the following composition. The ratio of the number of moles of Si to the total number of moles of the alkali metal(s), when the latter is taken as 2, may be, for example, not less than 0.9 or not more than 1.1. The ratio may be preferably not less than 0.95 or not less than 0.97, and may be preferably not more than 1.05 or not more than 1.03. The ratio of the number of moles of F to the total number of moles of the alkali metal(s), when the latter is taken as 2, may be, for example, not less than 5.9 or not more than 6.1. The ratio may be preferably not less than 5.95 or not less than 5.97, and may be preferably not more than 6.05 or not more than 6.03.

The second fluoride has a composition which is substantially free of Al and Mn. The term "substantially free of Al and Mn" herein means that, in the composition of the second fluoride, the ratio of the total number of moles of Al and Mn to the total number of moles of the alkali metal(s), when the latter is taken as 2, is, for example, not more than 0.005. The ratio may be preferably not more than 0.003 or less than 0.002.

The second fluoride may have, for example, a composition represented by the following Formula (Ib).

$$M^2{}_2[Si_uF_v] \quad \text{(Ib)}$$

In Formula (Ib), $M^2$ represents an alkali metal which may include at least K. u and v may satisfy 0.9≤u≤1.1 and 5.9≤v≤6.1. u and v may preferably satisfy 0.95≤u≤1.05 or 0.97≤u≤1.03; and 5.95≤v≤6.05 or 5.97≤v≤6.03.

The fluoride phosphor may have, for example, the following composition. The ratio of the total number of moles of Si, Al, and Mn to the total number of moles of the alkali metal(s), when the latter is taken as 2, may be, for example, not less than 0.9 or not more than 1.1. The ratio may be preferably not less than 0.95 or not less than 0.97, and may be preferably not more than 1.05 or not more than 1.03. The ratio of the number of moles of Al to the total number of moles of the alkali metal(s), when the latter is taken as 2, may be, for example, more than 0 and not more than 0.1. The ratio may be preferably not less than 0.002 or not less than 0.003, and may be preferably not more than 0.03, not more than 0.02, or not more than 0.015. The ratio of the number of moles of Mn to the total number of moles of the alkali metal(s), when the latter is taken as 2, may be, for example, more than 0 and not more than 0.2. The ratio may be preferably not less than 0.005, not less than 0.01, or not less than 0.015, and may be preferably not more than 0.15, not more than 0.12, or not more than 0.1. The ratio of the number of moles of F to the total number of moles of the alkali metal(s), when the latter is taken as 2, may be, for example, not less than 5.9 or not more than 6.1. The ratio may be preferably not less than 5.92 or not less than 5.95, and may be preferably not more than 6.05 or not more than 6.025. The ratio of the number of moles of Si to the total number of moles of the alkali metal(s), when the latter is taken as 2, may be, for example, not less than 0.7 or not more than 1.1. The ratio may be preferably not less than 0.8, not less than 0.85, or not less than 0.92, and may be preferably not more than 1.03, not more than 1.01, or less than 0.95. In the composition of the first fluoride, the ratio of the number of moles of Al to the number of moles of Si, may be, for example, not less than 0.001 or not more than 0.14. The ratio may be preferably not less than 0.002 or not less than 0.003, and may be preferably not more than 0.04 or not more than 0.015.

The fluoride phosphor may have a composition represented by the following Formula (II). The Al and the Mn contained in the composition represented by the following Formula (II) are mainly derived from the Al and the Mn contained in the composition of the first fluoride.

$$M^3{}_2[Si_xAl_yMn_zF_w] \quad (II)$$

In Formula (II), $M^3$ represents an alkali metal which may include at least K. Mn may be a tetravalent Mn ion. x, y, z, and w may satisfy $0.9 \leq x+y+z \leq 1.1$, $0 < y \leq 0.1$, $0 < z \leq 0.2$, and $5.9 \leq w \leq 6.1$. x, y, z, and w may preferably satisfy $0.95 \leq x+y+z \leq 1.05$ or $0.97 \leq x+y+z \leq 1.03$; $0 \leq y \leq 0.03$, $0.002 \leq y \leq 0.02$, or $0.003 \leq y \leq 0.015$; $0.005 \leq z \leq 0.15$, $0.01 \leq z \leq 0.12$, or $0.015 \leq z \leq 0.1$; and $5.92 \leq w \leq 6.05$ or $5.95 \leq w \leq 6.025$.

The second fluoride may be deposited on at least part of the surface of the first fluoride, or may be coating the surface to form a second fluoride layer. The second fluoride deposited on the surface of the first fluoride may uniformly have the above-described composition of the second fluoride, or may partially have a composition containing Al and Mn in an area(s) in contact with the first fluoride. More specifically, in the fluoride phosphor, an internal region composed of the first fluoride and a surface region composed of the second fluoride may be separated from each other by a distinct interface such that, for example, a bilayer structure composed of the first fluoride and the second fluoride is formed. Alternatively, a surface region composed of the second fluoride may be formed in a mode in which the Al and Mn concentrations gradually decrease toward the surface of the fluoride phosphor.

The content of the second fluoride in the fluoride phosphor may be, for example, not less than 1 mol % or not more than 30 mol % from the viewpoint of increasing durability while suppressing a decrease in the brightness of the fluoride phosphor. The content of the second fluoride in the fluoride phosphor may be preferably not less than 2 mol %, or not less than 3 mol %, and may be preferably not more than 25 mol % or not more than 20 mol %. In the fluoride phosphor in which the second fluoride is deposited, the content of the second fluoride in the fluoride phosphor may be calculated based on the fact that the amount of Mn per mole in the composition is lower than that in the first fluoride before the deposition of the second fluoride. More specifically, the content (mol %) of the second fluoride in the fluoride phosphor may be calculated as a percentage obtained by subtracting the molar amount of Mn contained in 1 mole of the fluoride phosphor in which the second fluoride is deposited, $M^1$, from the molar amount of Mn contained in 1 mole of the first fluoride before the deposition of the second fluoride, $M^0$, and then dividing the resulting value by $M^0$ $((M^0-M^1)/M^0)$.

The median diameter of the fluoride phosphor on a volume basis may be, for example, not less than 10 μm or not more than 90 μm from the viewpoint of increasing the brightness. The median diameter of the fluoride phosphor on a volume basis may be preferably not less than 15 μm or not less than 20 μm, and may be preferably not more than 70 μm or not more than 50 μm. In cases where there is a higher demand for thinning, for example, in cases of a sheet-shaped wavelength conversion member containing a fluoride phosphor, the median diameter of the fluoride phosphor on a volume basis may be not less than 0.2 μm or not more than 15 μm from the viewpoint of reducing the amount of the fluoride phosphor included. The median diameter of the fluoride phosphor on a volume basis may be preferably not less than 0.3 μm or not less than 0.5 μm, and may be preferably not more than 12 μm or not more than 10 μm. From the viewpoint of improvement of the brightness, the particle size distribution of the fluoride phosphor may show, for example, a single-peak particle size distribution, or may preferably show a single-peak particle size distribution having a narrow distribution width. More specifically, in the particle size distribution on a volume basis, when the particle size corresponding to the volume accumulation of 10% from the small-diameter side is defined as D10, and the particle size corresponding to the volume accumulation of 90% from the small-diameter side is defined as D90, the ratio of D90 to D10 (D90/D10) may be, for example, not more than 3.0. The median diameter on a volume basis is the particle size corresponding to the volume accumulation of 50% from the small-diameter side in the particle size distribution on a volume basis, and the particle size distribution on a volume basis is measured by a laser diffractive particle size distribution measurement apparatus.

In particular, in the fluoride phosphor, the part of the first fluoride is, for example, a phosphor activated by tetravalent manganese, and absorbs light in the short-wavelength region of visible light to emit red light. The light radiated to the fluoride phosphor may be light mainly in the blue region, and the peak wavelength of the light may be within the wavelength range of, for example, 380 nm to 485 nm. The emission peak wavelength in the emission spectrum of the fluoride phosphor may be within the wavelength range of, for example, 610 nm to 650 nm. The half-width in the emission spectrum of the fluoride phosphor may be, for example, not more than 10 nm.

The fluoride phosphor itself is capable of showing a good emission efficiency. The internal quantum efficiency of the fluoride phosphor may be, for example, not less than 88%, or may be preferably not less than 93% or not less than 94%. The internal quantum efficiency of the fluoride phosphor is measured, for example, using a quantum efficiency measurement apparatus with an excitation light at 450 nm.

Method of Producing Fluoride Phosphor

Figure 2:
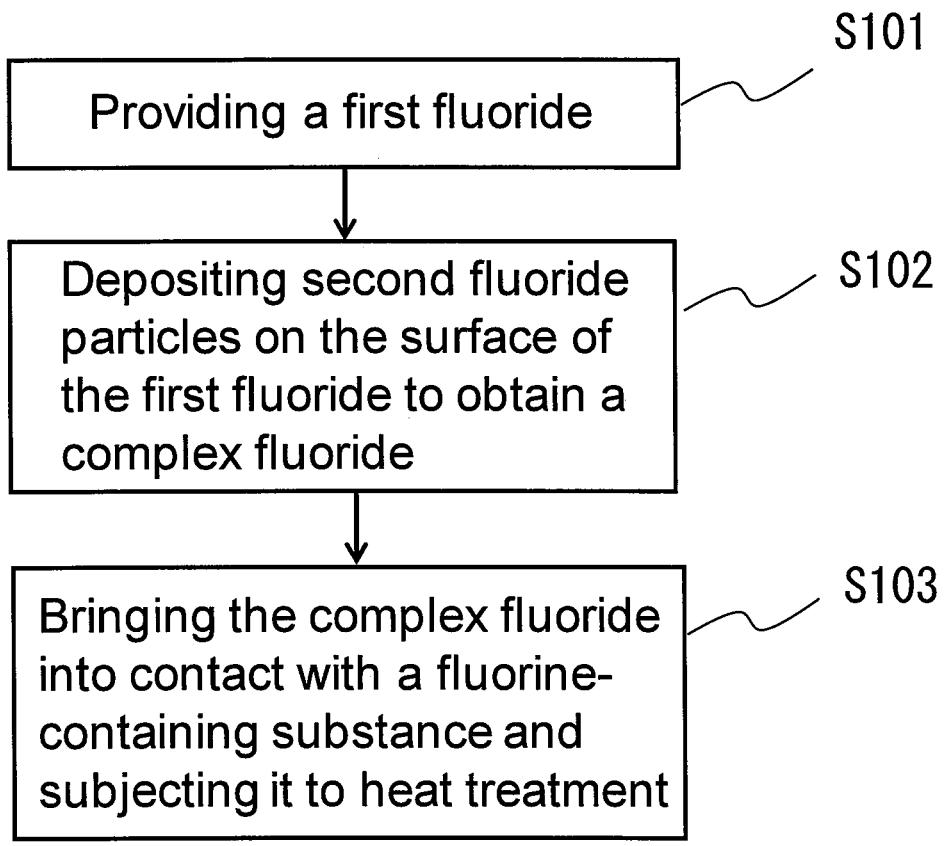
FIG. 2 is an exemplary flow chart illustrating an exemplary method of producing a fluoride phosphor.

FIG. 1 and FIG. 2 are flow charts illustrating examples of the process of the method of producing a fluoride phosphor. The method of producing a fluoride phosphor may include a first step (S101) of providing a first fluoride; and a second step (S102) of depositing second fluoride particles on at least part of the surface of the first fluoride. Further, the method of producing a fluoride phosphor may include a first step (S101) of providing a first fluoride; a second step (S102) of depositing second fluoride particles on at least part of the surface of the first fluoride; and a third step (S103) of bringing the complex fluoride in which the second fluoride is deposited, into contact with a fluorine-containing substance, and subjecting both of these to heat treatment.

More specifically, the method of producing a fluoride phosphor may include a first step of providing a first fluoride having a composition containing an alkali metal, Si, Al, Mn, and F, wherein, when the number of moles of the alkali metal is taken as 2, the total number of moles of Si, Al, and Mn is 0.9 to 1.1; the number of moles of Al is more than 0 and less than 0.10; the number of moles of Mn is more than 0 and less than 0.20; and the number of moles of F is 5.9 to 6.1; and a second step of bringing the first fluoride, a first solution containing Si and F, and a second solution containing an alkali metal into contact with each other in the presence of a reducing agent to deposit, on at least part of the surface of the first fluoride, a second fluoride having a composition which contains an alkali metal, Si, and F, and which is substantially free of Al and Mn, to obtain a complex fluoride.

By bringing the first fluoride, the first solution containing Si and F, and the second solution containing an alkali metal into contact with each other in the presence of the reducing agent, a fluoride phosphor in which the second fluoride is deposited on at least part of the surface of the first fluoride may be efficiently produced. A light-emitting device including a wavelength conversion member containing the obtained fluoride phosphor may have, for example, improved durability in a high-temperature driving environment.

In the first step, a first fluoride having a particular composition is provided. The first fluoride may be provided by purchasing, or may be provided by producing a first fluoride having a desired composition and desired properties. The first fluoride may be produced by, for example, the following production method. Details of the first fluoride provided are as described above.

The first fluoride may be produced by, for example, the production method according to Japanese Patent Application No. 2021-144746, which published as Japanese Application Publication No. JPA2022-099232, claiming the benefit of priority from Japanese Patent Application No. 2020-212532 or International Publication WO 2022/138205. More specifically, the first fluoride may be produced by a production method including providing a third fluoride having a composition containing an alkali metal, Si, Mn, and F; providing a fourth fluoride containing Al, an alkali metal, and F; and subjecting a mixture including the third fluoride having the composition containing the alkali metal, Si, Mn, and F; and the fourth fluoride containing Al, the alkali metal, and F; to heat treatment at a temperature of 600° C. to 780° C. in an inert gas atmosphere. In the composition of the third fluoride containing an alkali metal, Si, Mn, and F, when the total number of moles of the alkali metal is taken as 2, the ratio of the total number of moles of Si and Mn may be not less than 0.9 or not more than 1.1; the ratio of the number of moles of Mn may be more than 0 and not more than 0.2; and the ratio of the number of moles of F may be not less than 5.9 or not more than 6.1. In the composition of the fourth fluoride containing Al, an alkali metal, and F, when the number of moles of Al is taken as 1, the ratio of the total number of moles of the alkali metal may be not less than 1 or not more than 3, and the ratio of the number of moles of F may be not less than 4 or not more than 6. Further, when the number of moles of Al is taken as 1, the ratio of the total number of moles of the alkali metal may be not less than 2 or not more than 3, and the ratio of the number of moles of F may be not less than 5 or not more than 6.

The first fluoride provided in the first step may be a first fluoride subjected to heat treatment together with a fluorine-containing substance. More specifically, when necessary, the first step may further include a fluorination treatment step of bringing a purchased or produced first fluoride into contact with a fluorine-containing substance, and carrying out heat treatment at a temperature of not less than 400° C.; separately from the later-described third step of bringing the complex fluoride in which the second fluoride is deposited on the surface, obtained in the second step into contact with a fluorine-containing substance, and carrying out heat treatment. By carrying out the fluorination treatment step, a fluoride phosphor having even improved durability may be produced.

The fluorine-containing substance to be brought into contact with the first fluoride in the fluorination treatment step may be, for example, a substance containing at least one selected from the group consisting of $F_2$, $CHF_3$, $CF_4$, $NH_4HF_2$, HF, $SiF_4$, $KrF_2$, $XeF_2$, $XeF_4$, and $NF_3$. Examples of the method of bringing the first fluoride into contact with the fluorine-containing substance include a method in which the fluorine-containing substance is allowed to be present in the atmosphere in which the heat treatment of the first fluoride is carried out. Thus, the fluorination treatment step may include carrying out heat treatment of the first fluoride in an atmosphere containing a fluorine-containing substance.

The atmosphere containing the fluorine-containing substance may also contain an inert gas such as nitrogen gas or noble gas in addition to the fluorine-containing substance. The concentration of the fluorine-containing substance in the atmosphere containing the fluorine-containing substance may be, for example, not less than 3% by volume or not more than 35% by volume. The concentration of the fluorine-containing substance may be preferably not less than 5% by volume or not less than 10% by volume, and may be preferably not more than 30% by volume or not more than 25% by volume.

The temperature during the heat treatment in the fluorination treatment step may be, for example, not less than 400° C. or not more than 600° C. The temperature during the heat treatment may be preferably not less than 430° C. or not less than 450° C., and may be preferably not more than 570° C. or not more than 550° C. The length of time of the heat treatment may be, for example, not less than 1 hour or not more than 40 hours. The length of time of the heat treatment may be preferably not less than 2 hours or not less than 3 hours, and may be preferably not more than 30 hours or not more than 20 hours.

In the second step, the first fluoride, the first solution containing Si and F, and the second solution containing an alkali metal are brought into contact with each other in the presence of a reducing agent, to deposit a second fluoride having a composition which contains an alkali metal, Si, and F, and which is substantially free of Al and Mn, on at least part of the surface of the first fluoride, to thereby obtain a complex fluoride. The complex fluoride obtained may contain a fluoride phosphor.

The first solution contains Si and F, and may also contain another component, when necessary. The first solution may preferably contain, at least a complex ion containing silicon and a fluorine ion and hydrogen fluoride. The first solution is obtained, for example, as an aqueous solution that contains a complex ion containing silicon and a fluorine ion and hydrogen fluoride. The complex-ion source containing silicon and a fluorine ion is preferably a compound which contains silicon and a fluoride ion, and which has excellent solubility in a solution. Specific examples of the complex-ion source containing silicon and a fluorine ion include $H_2SiF_6$, $Na_2SiF_6$, $(NH_4)_2SiF_6$, $Rb_2SiF_6$, and $Cs_2SiF_6$. Among these, $H_2SiF_6$ is preferred since it has high solubility in water, and since it does not contain an alkali metal element as an impurity. As the complex-ion source containing silicon and a fluorine ion constituting the first solution, a single kind of complex-ion source may be used, or two or more kinds of complex-ion sources may be used in combination.

The lower limit of the concentration of the complex ion containing silicon and a fluorine ion in the first solution may be, for example, not less than 0.5% by mass, or may be preferably not less than 1% by mass, more preferably not less than 3% by mass. The upper limit of the concentration of the complex ion containing silicon and a fluorine ion in the first solution may be, for example, not more than 40% by mass, or may be preferably not more than 30% by mass, more preferably not more than 20% by mass. The lower limit of the concentration of hydrogen fluoride in the first solution may be, for example, not less than 5% by mass, or may be preferably not less than 10% by mass, more preferably not less than 20% by mass. The upper limit of the concentration of hydrogen fluoride in the first solution may be, for example, not more than 80% by mass, or may be preferably not more than 75% by mass, more preferably not more than 70% by mass.

The first solution may also contain an alkali metal. By the inclusion of the alkali metal in the first solution, solubility of the first fluoride in the first solution decreases, so that dissolution of the first fluoride in the first solution may be suppressed. The alkali metal contained in the first solution may include the same alkali metal as an alkali metal contained in the first fluoride. The alkali metal may be contained as an alkali metal ion, and may include at least a potassium ion. In cases where the first solution contains an alkali metal in addition to Si and F, the first solution may be prepared by dissolving a compound containing the alkali metal, in a solution that contains: a complex-ion source containing silicon and a fluorine ion; and hydrogen fluoride. Examples of the compound containing the alkali metal include water-soluble compounds of halides, hydrogen fluorides, hydroxides, acetates, carbonates, and the like containing an alkali metal ion. Specific examples of the compound include water-soluble alkali metal salts such as KF, $KHF_2$, KOH, KCl, KBr, KI, $CH_3COOK$, and $K_2CO_3$. In particular, $KHF_2$ is preferred since it is highly safe due to its low heat of dissolution. As the compound containing the alkali metal constituting the first solution, a single kind of compound may be used, or two or more kinds of compounds may be used in combination.

In cases where the first solution contains an alkali metal, the lower limit of the concentration of the alkali metal ion in the first solution may be, for example, not less than 0.05% by mass, or may be preferably not less than 0.1% by mass, more preferably not less than 0.2% by mass. The upper limit of the concentration of the alkali metal in the first solution may be, for example, not more than 10% by mass, or may be preferably not more than 5% by mass, more preferably not more than 3% by mass.

The second solution contains at least an alkali metal, and may also contain another component, when necessary. The alkali metal may be included as an alkali metal ion, and may include at least a potassium ion. The second solution may also contain hydrogen fluoride in addition to the alkali metal. The second solution is obtained, for example, as an aqueous solution of hydrofluoric acid of a compound containing an alkali metal. Examples of the compound containing the alkali metal constituting the first solution include water-soluble compounds of halides, hydrogen fluorides, hydroxides, acetates, carbonates, and the like containing an alkali metal ion. Specific examples of the compound include water-soluble alkali metal salts such as KF, $KHF_2$, KOH, KCl, KBr, KI, $CH_3COOK$, and $K_2CO_3$. In particular, $KHF_2$ is preferred since it may be dissolved without decreasing the hydrogen fluoride concentration in the solution, and since it is highly safe due to its low heat of dissolution. As the compound containing the alkali metal constituting the second solution, a single kind of compound may be used, or two or more kinds of compounds may be used in combination.

The lower limit of the alkali metal ion concentration in the second solution may be, for example, not less than 0.1% by mass, or may be preferably not less than 0.2% by mass, more preferably not less than 0.4% by mass. The upper limit of the alkali metal ion concentration in the second solution may be, for example, not more than 40% by mass, or may be preferably not more than 30% by mass, more preferably not more than 25% by mass. The lower limit of the concentration of hydrogen fluoride in the second solution may be, for example, not less than 5% by mass, or may be preferably not less than 10% by mass, more preferably not less than 20% by mass. The upper limit of the concentration of hydrogen fluoride in the second solution may be, for example, not more than 80% by mass, or may be preferably not more than 75% by mass, more preferably not more than 70% by mass.

The reducing agent used in the second step may be a third solution containing a reducing agent. The third solution contains at least a reducing agent, and may also contain another component, when necessary. As the third solution, for example, a solution containing a reducing agent such as hydrogen peroxide or oxalic acid may be used. Among these, hydrogen peroxide is preferred from the viewpoint of its ability to reduce eluted tetravalent Mn ions without adversely affecting fluoride particles, and from the viewpoint of the fact that, since hydrogen peroxide is degraded into water and oxygen, which are harmless substances, hydrogen peroxide may be easily used in the production process and causes less environmental load. The concentration of the reducing agent in the third solution may be, for example, not less than 1% by mass or not more than 70% by mass, or may be preferably not less than 5% by mass or not more than 50% by mass.

Examples of the method of bringing the first fluoride, the first solution, and the second solution into contact with each other in the presence of the reducing agent include mixing the first fluoride, the first solution, the second solution, and the reducing agent together. More specifically, for example, while the first solution is stirred, the first fluoride is added thereto, and then the reducing agent is added thereto. Thereafter, the second solution may be added thereto to achieve the mixing. By bringing the first fluoride, the first solution, and the second solution into contact with each other in the presence of the reducing agent, the tetravalent manganese ions that may be released from the first fluoride are reduced to suppress introduction of Mn into the second fluoride.

The reaction temperature in the second step may be, for example, not less than 10° C. or not more than 40° C. The temperature may be preferably not less than 15° C. or not more than 30° C. In the second step, in cases where the second solution is added to a mixture containing the first solution, the first fluoride, and the reducing agent, the length of time required for the addition of the second solution may be, for example, not less than 1 minute or not more than 60 minutes.

By bringing the first fluoride, the first solution, and the second solution into contact with each other in the presence of the reducing agent, the complex ion containing silicon and a fluorine ion is allowed to react with the alkali metal ion to achieve the deposition of the second fluoride containing the alkali metal, Si, and F, on at least part of the surface of the first fluoride, to produce the complex fluoride. In the composition of the second fluoride, when the total number of moles of the alkali metal is taken as 2, the number of moles of Si may be not less than 0.9 or not more than 1.1, and the number of moles of F may be not less than 5.9 or not more than 6.1. Details of the second fluoride are as described above.

The complex fluoride obtained in the second step may be collected by solid-liquid separation by filtration or the like. The complex fluoride collected may be washed by addition of a reducing agent such as a hydrogen peroxide solution, or may be washed with a solvent such as ethanol, isopropyl alcohol, water, or acetone. Further, drying treatment may be carried out. The temperature for carrying out the drying treatment may be, for example, not less than 50° C., preferably not less than 55° C., more preferably not less than 60° C., and may be, for example, not more than 110° C., preferably not more than 105° C., more preferably not more than 100° C. The drying time is not limited as long as the water adhering to the complex fluoride may be removed, and may be, for example, about 10 hours.

The method of producing the fluoride phosphor may further include a third step of bringing the complex fluoride in which the second fluoride is deposited on the surface, obtained in the second step into contact with a fluorine-containing substance, and carrying out heat treatment at a temperature of not less than 400° C. By carrying out the third step, a fluoride phosphor having even improved durability may be produced.

The fluorine-containing substance to be brought into contact with the complex fluoride in the third step may be a substance containing at least one selected from the group consisting of $F_2$, $CHF_3$, $CF_4$, $NH_4HF_2$, HF, $SiF_4$, $KrF_2$, $XeF_2$, $XeF_4$, and $NF_3$. Examples of the method of bringing the complex fluoride into contact with the fluorine-containing substance include a method in which the fluorine-containing substance is allowed to be present in the atmosphere in which the heat treatment of the complex fluoride is carried out. More specifically, the third step may include carrying out heat treatment of the complex fluoride in an atmosphere containing the fluorine-containing substance.

The atmosphere containing the fluorine-containing substance may also contain an inert gas such as nitrogen gas or noble gas in addition to the fluorine-containing substance. The concentration of the fluorine-containing substance in the atmosphere containing the fluorine-containing substance may be, for example, 3% by volume to 35% by volume. The concentration of the fluorine-containing substance may be preferably not less than 5% by volume or not less than 10% by volume, and may be preferably not more than 30% by volume or not more than 25% by volume.

The temperature in the heat treatment in the third step may be, for example, not less than 400° C. or not more than 600° C. The temperature in the heat treatment may be preferably not less than 430° C. or not less than 450° C., and may be preferably not more than 570° C. or not more than 550° C. The length of time of the heat treatment may be, for example, not less than 1 hour or not more than 40 hours. The length of time of the heat treatment may be preferably not less than 2 hours or not less than 3 hours, and may be preferably not more than 30 hours or not more than 20 hours.

Light-Emitting Device

The light-emitting device include a wavelength conversion member containing a first luminescent material containing the fluoride phosphor and a light-emitting element that radiates light to the first luminescent material. The light-emitting device may further include another component, when necessary.

One example of the light-emitting device is described below based on a drawing. is an exemplary schematic cross-sectional view illustrating the light-emitting device according to the present embodiment. This light-emitting device is one example of a surface-mounted light-emitting device. The light-emitting device 100 includes a light-emitting element 10 that emits light having an emission peak wavelength within the range of, for example, 380 nm to 485 nm and a molded product 40 on which a light-emitting element 10 is placed. The molded product 40 includes a first lead 20 and a second lead 30, and is formed by integral molding using a thermoplastic resin or thermosetting resin. In the molded product 40, a recess having a bottom surface and a side surface 42 is formed, and the light-emitting element 10 is placed on the bottom surface of the recess. The light-emitting element 10 includes a pair of positive and negative electrodes, and the pair of positive and negative electrodes are electrically connected to the first lead 20 and the second lead 30 through wires 60. The light-emitting element 10 is sealed with a wavelength conversion member 50. The wavelength conversion member 50 includes a luminescent material 70 containing a fluoride phosphor that converts the wavelength of light from the light-emitting element 10. The luminescent material 70 may include a first luminescent material containing the fluoride phosphor; and a second luminescent material that emits light having an emission peak wavelength within a wavelength range that is different from that of the fluoride phosphor, upon irradiation with light from the light-emitting element 10.

The wavelength conversion member may include a resin in addition to the luminescent material. Examples of the resin constituting the wavelength conversion member include silicone resins and epoxy resins. The wavelength conversion member may further include a light-dispersing material in addition to the resin and the luminescent material. By the inclusion of the light-dispersing material, directionality from the light-emitting element may be decreased, to increase the viewing angle. Examples of the light-dispersing material include silicon oxide, titanium oxide, zinc oxide, zirconium oxide, and aluminum oxide.

The light-emitting element emits light having an emission peak wavelength within the wavelength range of 380 nm to 485 nm, which is the short-wavelength region of visible light. The light-emitting element emits light to be radiated to the fluoride phosphor. The light-emitting element preferably has an emission peak wavelength within the range of 380 nm to 480 nm, more preferably has an emission peak wavelength within the range of 410 nm to 480 nm, still more preferably has an emission peak wavelength within the range of 430 nm to 480 nm. As the light-emitting element, a semiconductor light-emitting element is preferably used. The use of the semiconductor light-emitting element enables production of a light-emitting device which is highly efficient, which shows high linearity of output in response to an input, which has high resistance to mechanical impacts, and which is stable. Examples of the semiconductor light-emitting element that may be used include semiconductor light-emitting elements using a nitride semiconductor. The half-width of the emission peak in the emission spectrum of the light-emitting element is, for example, preferably not more than 30 nm.

The light-emitting device includes, as a component, a first luminescent material containing a fluoride phosphor. Details of the fluoride phosphor contained in the light-emitting device are as described above. The fluoride phosphor is contained in, for example, the wavelength conversion member covering the light-emitting element. In the light-emitting device covered with the wavelength conversion member containing the fluoride phosphor, part of the light emitted from the light-emitting element is absorbed by the fluoride phosphor, to cause radiation of red light. By using a light-emitting element that emits light having an emission peak wavelength within the range of 380 nm to 485 nm, the radiated light may be more effectively utilized, and loss of the light emitted from the light-emitting device may be decreased, so that a highly efficient light-emitting device may be provided.

The light-emitting device preferably further includes, in addition to the first luminescent material containing the fluoride phosphor, a second luminescent material containing a luminescent material other than the fluoride phosphor. The luminescent material other than the fluoride phosphor may be a material that emits light having a wavelength different from that of the fluoride phosphor, upon irradiation with light from the light-emitting element. The second luminescent material may be contained, for example, in the wavelength conversion member similarly to the first luminescent material.

The second luminescent material may have an emission peak wavelength within the wavelength range of 495 nm to 590 nm, and may preferably be at least one selected from the group consisting of a β-SiAlON phosphor, a halosilicate phosphor, a silicate phosphor, a rare-earth aluminate phosphor, a perovskite quantum dot, a nitride phosphor, and a chalcopyrite quantum dot. The β-SiAlON phosphor may have, for example, a composition represented by the following Formula (IIa). The halosilicate phosphor may have, for example, the composition represented by the following Formula (IIb). The silicate phosphor may have, for example, the composition represented by the following Formula (IIc). The rare-earth aluminate phosphor may have the composition represented by the following Formula (IId). The perovskite quantum dot may have, for example, the composition represented by the following Formula (IIe). The nitride phosphor may have, for example, the composition represented by the following Formula (IIf), (IIg), or (IIh). The chalcopyrite quantum dot may have, for example, the composition represented by the following Formula (Ili).

$$Si_{6-t}Al_tO_tN_{8-t}:Eu \tag{IIa}$$

In the formula, t represents a number satisfying $0<t\leq 4.2$.

$$(Ca,Sr,Ba)_8MgSi_4O_{16}(F,Cl,Br)_2:Eu \tag{IIb}$$

$$(Ba,Sr,Ca,Mg)_2SiO_4:Eu \tag{IIc}$$

$$(Y,Lu,Gd,Tb)_3(Al,Ga)_5O_{12}:Ce \tag{IId}$$

$$CsPb(F,Cl,Br,I)_3 \tag{IIe}$$

$$(La,Y,Gd)_2Si_6N_{11}:Ce \tag{IIf}$$

$$(Sr,Ca)LiAl_3N_4:Eu \tag{IIg}$$

$$(Ca,Sr)AlSiN_3:Eu \tag{IIh}$$

$$(Ag,Cu,Au)(In,Ga)(S,Se,Te)_2 \tag{Ili}$$

EXAMPLES

The present invention is described below concretely by way of Examples. However, the present invention is not limited by these Examples.

Production Example 1

Production of First Fluoride

After weighing 7029 g of $KHF_2$, the $KHF_2$ was dissolved in 35.0 L of 55% by mass aqueous HF solution, to prepare Solution A. Further, after weighing 1309.5 g of $K_2MnF_6$, the $K_2MnF_6$ was dissolved in 12.0 L of 55% by mass aqueous HF solution, to prepare Solution B. Subsequently, 15.5 L of an aqueous solution containing 40% by mass $H_2SiF_6$ was prepared to provide Solution C. Subsequently, while Solution A was stirred at room temperature, Solution B and Solution C were added dropwise thereto for about 20 hours. Thereafter, 400 ml of 35% hydrogen peroxide solution was added thereto, and then washing with pure water was carried out. The resulting precipitate was subjected to solid-liquid separation, and then washed with ethanol, followed by drying at 90° C. for 10 hours, to obtain Fluoride A. The Fluoride A obtained had a composition represented by $K_2[Si_{0.930}Mn_{0.070}F_6]$.

After weighing 2000 g of the obtained Fluoride A having the composition represented by $K_2[Si_{0.930}Mn_{0.070}F_6]$, and 28.48 g of Fluoride B having the composition represented by $K_3[AlF_6]$, they were mixed together to prepare a mixture. In an inert gas atmosphere having a nitrogen gas concentration of 100% by volume, the mixture of Fluoride A and Fluoride B was subjected to heat treatment at a temperature of 700° C. for a heat treatment time of 5 hours, to obtain a heat-treated product. The heat-treated product obtained was sufficiently washed with washing water containing 1% by mass hydrogen peroxide, and then subjected to solid-liquid separation, followed by ethanol washing, and then drying at 90° C. for 10 hours. While the product was brought into contact with fluorine gas in an atmosphere having a fluorine gas ($F_2$) concentration of 20% by mass and a nitrogen gas concentration of 80% by mass, heat treatment was carried out at a temperature of 500° C. for a retention time of 8 hours, to produce a first fluoride of Production Example 1.

The first fluoride of Production Example 1 obtained had the composition represented by $K_2[Si_{0.924}Al_{0.010}MN_{0.066}F_{5.990}]$.

Production Example 2

A first fluoride of Production Example 2 was produced under the same conditions as in Production Example 1 except that a fluoride having the composition represented by $K_2[Si_{0.945}Mn_{0.55}F_6]$ was used as Fluoride A, and that the mass of Fluoride B was 23.69 g.

The first fluoride of Production Example 2 obtained had the composition represented by $K_2[Si_{0.939}Al_{0.009}Mn_{0.052}F_{5.991}]$.

Production Example 3

A first fluoride of Production Example 3 was produced under the same conditions as in Production Example 1 except that a fluoride having the composition represented by $K_2[Si_{0.956}Mn_{0.44}F_6]$ was used as Fluoride A, and that the mass of Fluoride B was 30.89 g.

The first fluoride of Production Example 3 obtained had the composition represented by $K_2[Si_{0.947}Al_{0.011}Mn_{0.042}F_{5.989}]$.

Example 1

To 14.0 L of 55% by mass aqueous HF solution, 2.61 L of 40% by mass aqueous $H_2SiF_6$ solution was added, and 300 g of $KHF_2$ was dissolved therein to prepare a first solution. Further, 133 g of $KHF_2$ was dissolved in 6.0 L of 55% by mass aqueous HF solution, to prepare a second solution. Further, 100 mL of 35% by mass hydrogen peroxide solution was provided as a third solution. Subsequently, while the first solution was stirred at room temperature, 3000 g of the first fluoride produced in Production Example 1 was added thereto, followed by addition of the third solution thereto, and adding the second solution dropwise thereto for about 10 minutes. The resulting precipitate was subjected to solid-liquid separation, and then washed with ethanol, followed by drying at 90° C. for 10 hours, to obtain a fluoride phosphor of Example 1 containing a complex fluoride.

The fluoride phosphor of Example 1 obtained had the composition represented by $K_2[Si_{0.930}Al_{0.008}Mn_{0.062}F_{5.992}]$.

Example 2

While the fluoride phosphor containing a complex fluoride obtained in Example 1 was brought into contact with fluorine gas in an atmosphere having a fluorine gas concentration of 20% by mass and a nitrogen gas concentration of 80% by mass, heat treatment was carried out at a temperature of 500° C. for a retention time of 8 hours, to produce a fluoride phosphor of Example 2.

The fluoride phosphor of Example 2 obtained had the composition represented by $K_2[Si_{0.930}Al_{0.008}Mn_{0.062}F_{5.992}]$.

Example 3

A fluoride phosphor was prepared under the same conditions as in Example 1 except that the first fluoride of Production Example 2 was used instead of the first fluoride of Production Example 1. While the fluoride phosphor containing a complex fluoride obtained was brought into contact with fluorine gas in an atmosphere having a fluorine gas concentration of 20% by mass and a nitrogen gas concentration of 80% by mass, heat treatment was carried out at a temperature of 500° C. for a retention time of 8 hours, to produce a fluoride phosphor of Example 3.

The fluoride phosphor of Example 3 obtained had the composition represented by $K_2[Si_{0.943}Al_{0.008}Mn_{0.049}F_{5.992}]$.

Example 4

A fluoride phosphor of Example 4 was prepared under the same conditions as in Example 3 except that the first fluoride of Production Example 3 was used instead of the first fluoride of Production Example 1.

The fluoride phosphor of Example 4 obtained had the composition represented by $K_2[Si_{0.951}Al_{0.010}Mn_{0.39}F_{5.990}]$.

Comparative Example 1

The first fluoride obtained in Production Example 1 was provided as a fluoride phosphor of Comparative Example 1.
Evaluation
Chromaticity Coordinate Each of the fluoride phosphors obtained in Examples and Comparative Example was irradiated with an excitation light having a peak wavelength of 450 nm using a quantum efficiency measurement apparatus (product name, QE-2000; manufactured by Otsuka Electronics Co. Ltd.), and the emission spectrum of the fluoride phosphor at room temperature (25° C.) was measured. From the emission spectrum data of each of the fluoride phosphors of Examples and Comparative Example, the xy chromaticity coordinate in the CIE (Commission international de l'eclarirage) 1931 colorimetric system was determined. The results are shown in Table 1.
Relative Brightness From the emission spectrum data measured for each of the fluoride phosphors obtained in Examples and Comparative Example, the luminescence brightness of each of the fluoride phosphors of Examples 1 to 4 was determined as a relative brightness taking the luminescence brightness of the fluoride phosphor of Comparative Example 1 as 100%. The results are shown in Table 1.
Internal Quantum Efficiency For each of the fluoride phosphors obtained in Examples and Comparative Example, the internal quantum efficiency for an excitation light having a peak wavelength of 450 nm was measured using a quantum efficiency measurement apparatus (product name, QE-2000; manufactured by Otsuka Electronics Co. Ltd.). The results are shown in Table 1.
Composition For each of the fluoride phosphors obtained in Examples and Comparative Example, composition analysis by inductively coupled plasma atomic emission spectroscopy (ICP-AES) was carried out, and the molar content ratio of each of the elements Al and Mn (y and z in the Formula (II) described above) was calculated taking the number of moles of the alkali metal(s) including potassium contained in the composition as 2. The results are shown in Table 1.
Content of Second Fluoride From the difference between the Mn analysis values observed before and after the formation of the surface region, the content of the second fluoride in the fluoride phosphor was calculated. More specifically, the molar amount of Mn contained in 1 mole of the fluoride phosphor after the formation of the surface region, $M^1$, was subtracted from the molar amount of Mn contained in 1 mole of the fluoride phosphor before the formation of the surface region, $M^0$, and the resulting value was divided by $M^0$ (($M^0-M^1$)/$M^0$), to calculate the content of the second fluoride (mol %) as a percentage. The results are shown in Table 1.

Production Example of Light-Emitting Device

Figure 3:
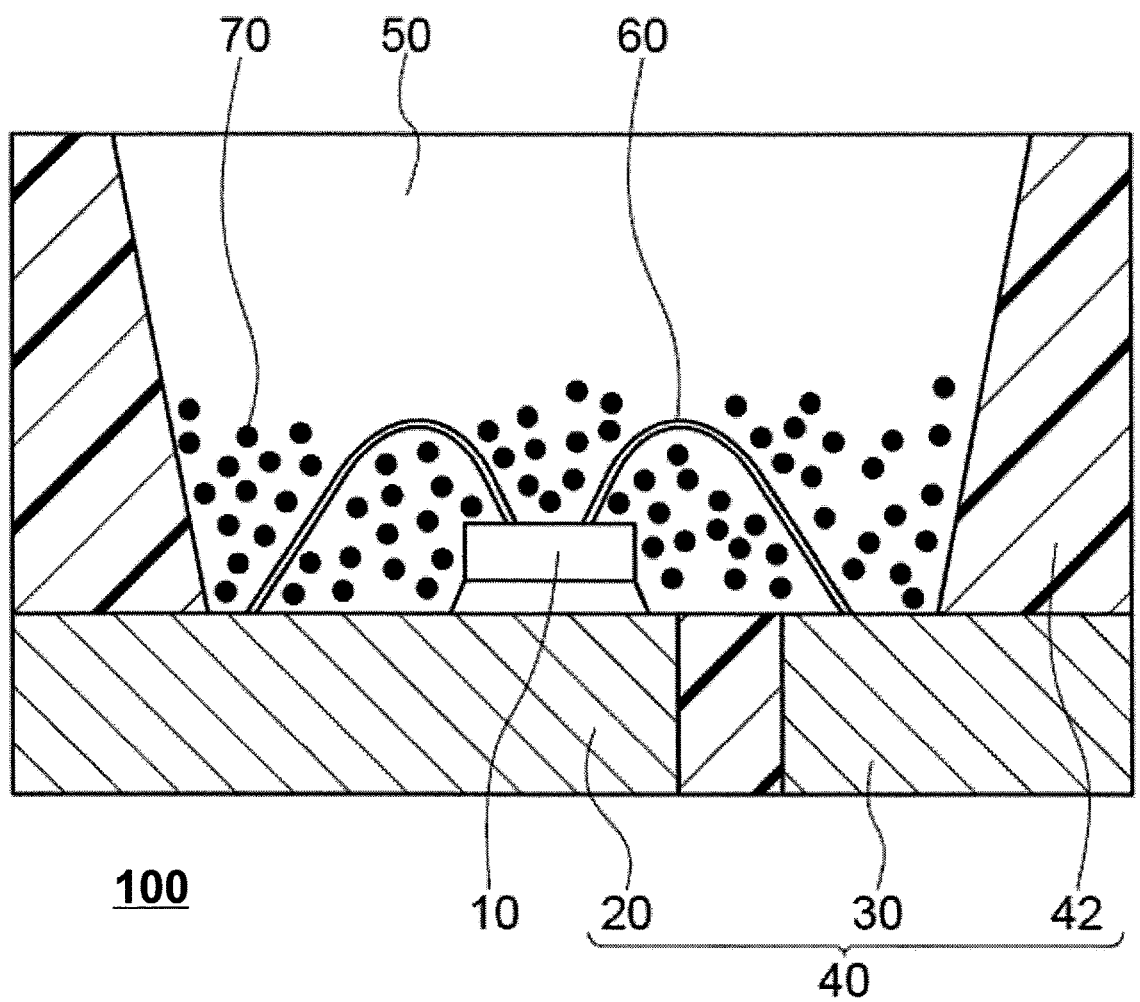
FIG. 3 is an exemplary schematic cross-sectional view illustrating an exemplary light-emitting device using a fluoride phosphor.

Each of the fluoride phosphors obtained in Examples and Comparative Example was used as the first luminescent material. Further, as the second luminescent material, a β-SiAlON phosphor having the composition represented by $Si_{5.81}Al_{0.19}O_{0.19}N_{7.81}$:Eu and an emission peak wavelength near 540 nm was used. A resin composition was obtained by mixing a silicone resin with a luminescent material 70 prepared by mixing the first luminescent material 71 and the second luminescent material 72 together such that x was near 0.280 and y was near 0.270 in the chromaticity coordinate in the CIE 1931 colorimetric system. Subsequently, a molded product 40 in which a recess is formed as shown in FIG. 3 was provided. On the bottom surface of the recess, a light-emitting element 10 which is prepared using a gallium nitride compound semiconductor as a material, and which has an emission peak wavelength of 451 nm, was placed on a first lead 20. Thereafter, electrodes of the light-emitting element 10 were connected to the first lead 20 and a second lead 30, respectively, through wires 60. Further, a resin composition was injected into the recess of the molded product 40 using a syringe such that the light-emitting element 10 was covered therewith, and then the resin composition was cured to form a wavelength conversion member. A light-emitting device was thus produced.
Evaluation of Durability Each of the light-emitting devices using the fluoride phosphors obtained in Examples and Comparative Example was subjected to a durability test, in which evaluation was carried out after allowing 500 hours of continuous emission in an environment at 85° C. at a current value of 150 mA. Using the x value of chromaticity, in the CIE 1931 colorimetric system, of the light-emitting device before the durability test as an initial value, the absolute value, Δx, of the change in the x value in the CIE 1931 colorimetric system from the initial value was determined for the light-emitting device after the durability test. Using Δx of the light-emitting device using the fluoride phosphor of Comparative Example 1 as a standard (100%), the relative rate of change in Δx (%) compared to the standard, 100%, was determined for the Δx value calculated for each of the light-emitting devices of Examples and Comparative Example. The lower the relative rate of change in Δx (%), the smaller the change in the chromaticity, indicating higher durability. The results are shown in Table 1.

TABLE 1

|  | Fluoride phosphor | | | | | | Light-emitting device |
| --- | --- | --- | --- | --- | --- | --- | --- |
| | Chromaticity Coordinate | | Relative brightness | Internal quantum efficiency | Al ratio | Mn ratio | Content of second fluoride | Relative rate of change in Δx |
| | x | y | (%) | (%) | (y) | (z) | (mol %) | (%) |
| Comparative Example 1 | 0.693 | 0.306 | 100.0 | 92.9 | 0.010 | 0.066 | 0 | 100.0 |
| Example 1 | 0.693 | 0.306 | 94.8 | 88.7 | 0.008 | 0.062 | 6 | 95.4 |
| Example 2 | 0.693 | 0.306 | 98.5 | 94.0 | 0.008 | 0.062 | 6 | 82.4 |
| Example 3 | 0.694 | 0.306 | 98.7 | 94.3 | 0.008 | 0.049 | 6 | 74.1 |
| Example 4 | 0.694 | 0.306 | 95.2 | 94.7 | 0.010 | 0.039 | 6 | 68.2 |

As shown in Table 1, the fluoride phosphors of Examples 1 to 4 had a lower Al or Mn content compared to Comparative Example 1 since, in the fluoride phosphors of Examples 1 to 4, the second fluoride which is substantially free of Al and Mn, and which contains an alkali metal, Si, and F, was formed in the surface region. In other words, in the fluoride phosphors of Examples 1 to 4, the content of the second fluoride was higher than in Comparative Example 1. In the light-emitting devices using the fluoride phosphors of Examples 1 to 4, the rate of the change in Δx caused by the durability test in the environment at the relatively high temperature, 85° C., was lower than in the light-emitting device using the fluoride phosphor of Comparative Example 1, indicating higher durability of the light-emitting devices using the fluoride phosphors of Examples 1 to 4. It is assumed that the fluoride phosphors of Examples 1 to 4 had stable crystal structures and increased durability because of the formation, in the surface region, of the second fluoride substantially free of Al and Mn, whose difference in the ion radius changes the crystal structure.

The fluoride phosphor of Example 1 had improved durability compared to Comparative Example 1, but showed a slightly lower internal quantum efficiency and a slightly higher rate of change in Δx compared to Example 2, in which the heat treatment was carried out in the atmosphere containing fluorine gas. The reason is assumed to be elution of Al that occurred during the formation of the second fluoride in the surface region, which elution changed the valence of Mn for supplementing the eluted amount of charge, resulting in a decrease in the tetravalent Mn as an activator. In contrast, in Example 2, it is assumed that, since the heat treatment in the atmosphere containing fluorine gas allowed the fluorine gas to function as an oxidizing agent, the tetravalence of Mn as the activator was more likely to be maintained, resulting the higher durability.

The fluoride phosphor obtained by the production method of the present disclosure is suitably applicable to light sources, such as light sources for lighting, LED displays, and backlights for liquid crystal; signals; illuminated switches; sensors; indicators; compact flash lamps; and the like.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A fluoride phosphor comprising:
   a first fluoride having a composition containing an alkali metal, Si, Al, Mn, and F, wherein, when a number of moles of the alkali metal is taken as 2, a total number of moles of Si, Al, and Mn is 0.9 to 1.1; a number of moles of Al is more than 0 and equal to or less than 0.10; a number of moles of Mn is more than 0 and equal to or less than 0.20; and a number of moles of F is 5.9 to 6.1; and
   a second fluoride deposited on at least part of a surface of the first fluoride, the second fluoride having a composition which contains an alkali metal, Si, and F, and which is substantially free of Al and Mn,
   wherein a content of the second fluoride in the fluoride phosphor is not more than 30 mol %,
   wherein the alkali metal in the first fluoride comprises at least one selected from the group consisting of Li, Na, K, Rb and Cs, and
   wherein the alkali metal in the second fluoride comprises at least one selected from the group consisting of Li, Na, K, Rb and Cs.

2. The fluoride phosphor according to claim 1, wherein the first fluoride has a composition represented by Formula (Ia), and the second fluoride phosphor has a composition represented by Formula (Ib):

$$M^1_2[Si_pAl_qMn_rF_s] \quad \text{(Ia)},$$

wherein in Formula (Ia), $M^1$ represents an alkali metal comprising at least one selected from the group consisting of Li, Na, K, Rb and Cs, and p, q, r, and s satisfy $0.9 < p+q+r \le 1.1$, $0 < r \le 0.2$, $0 < q \le 0.1$, and $5.9 \le s \le 6.1$;

$$M^2_2[Si_uF_v] \quad \text{(Ib)},$$

wherein in Formula (Ib), $M^2$ represents an alkali metal comprising at least one selected from the group consisting of Li, Na, K, Rb and Cs, and u and v satisfy $0.9 \le u \le 1.1$ and $5.9 \le v \le 6.1$.

3. The fluoride phosphor according to claim 2, wherein r and q satisfy $0 < r < 0.2$ and $0 < q < 0.1$.

4. The fluoride phosphor according to claim 1, wherein a content of the second fluoride in the fluoride phosphor is not more than 20 mol %.

5. The fluoride phosphor according to claim 1, wherein the alkali metal in the first fluoride comprises at least K and the alkali metal in the second fluoride comprises at least K.

6. The fluoride phosphor according to claim 1, wherein the alkali metal in the first fluoride substantially consists of K and the alkali metal in the second fluoride substantially consists of K.

7. The fluoride phosphor according to claim 1, wherein the fluoride phosphor has a composition represented by the following Formula (II):

$$M^3_2[Si_xAl_yMn_zF_w] \quad \text{(II)},$$

wherein in Formula (II), $M^3$ represents an alkali metal comprising at least one selected from the group consisting of Li, Na, K, Rb and Cs, and x, y, z, and w satisfy $0.9 \le x+y+z \le 1.1$, $0 < y \le 0.1$, $0 < z \le 0.2$, and $5.9 \le w \le 6.1$.

8. A light-emitting device comprising:
   a first luminescent material containing the fluoride phosphor according to claim 1; and
   a light-emitting element that radiates light to the first luminescent material.

9. The light-emitting device according to claim 8, further comprising a second luminescent material having an emission peak wavelength within a range of 495 nm to 590 nm.

10. The light-emitting device according to claim 9, wherein the second luminescent material comprises at least one selected from the group consisting of a β-SiAlON phosphor, a halosilicate phosphor, a silicate phosphor, a rare-earth aluminate phosphor, a perovskite quantum dot, a nitride phosphor, and a chalcopyrite quantum dot.

11. The light-emitting device according to claim 9, wherein the second luminescent material comprises at least one selected from the group consisting of luminescent materials having a composition represented by any of the following Formulae (IIa) to (IIi):

$$Si_{6-t}Al_tO_tN_{8-t}:Eu \quad \text{(IIa)},$$

wherein $0 < t \le 4.2$;

$$(Ca,Sr,Ba)_8MgSi_4O_{16}(F,Cl,Br)_2:Eu \quad \text{(IIb)};$$

$$(Ba,Sr,Ca,Mg)_2SiO_4:Eu \quad \text{(IIc)};$$

$$(Y,Lu,Gd,Tb)_3(Al,Ga)_5O_{12}:Ce \quad \text{(IId)};$$

$$CsPb(F,Cl,Br,I)_3 \quad \text{(IIe)};$$

$$(La,Y,Gd)_3Si_6N_{11}:Ce \quad \text{(IIf)};$$

$$(Sr,Ca)LiAl_3N_4:Eu \quad \text{(IIg)};$$

$$(Ca,Sr)AlSiN_3:Eu \quad \text{(IIh); and}$$

$$(Ag,Cu,Au)(In,Ga)(S,Se,Te)_2 \quad \text{(IIi)}.$$

12. A method of producing a fluoride phosphor, the method comprising:
   providing a first fluoride having a composition containing an alkali metal, Si, Al, Mn, and F, wherein, when a number of moles of the alkali metal is taken as 2, a total number of moles of Si, Al and Mn is 0.9 to 1.1; a number of moles of Al is more than 0 and equal to or less than 0.10; a number of moles of Mn is more than 0 and equal to or less than 0.20; and a number of moles of F is 5.9 to 6.1;
   bringing the first fluoride, first solution containing Si and F, and a second solution containing an alkali metal into contact with each other in the presence of a reducing agent to deposit, on at least part of a surface of the first fluoride, a second fluoride having a composition which contains an alkali metal, Si, and F, and which is substantially free of Al and Mn, to obtain a complex fluoride; and
   bringing the complex fluoride into contact with a fluorine-containing substance, and carrying out heat treatment at a temperature of not less than 400° C.

13. The method of producing a fluoride phosphor according to claim 12, wherein the first solution further contains an alkali metal.

14. The method of producing a fluoride phosphor according to claim 12, wherein the first fluoride has a composition represented by Formula (Ia), and the second fluoride has a composition represented by Formula (Ib):

$$M^1_2[Si_pAl_qMn_rF_s] \quad (Ia),$$

wherein in Formula (Ia), $M^1$ represents an alkali metal, and p, q, r, and s satisfy $0.9 \leq p+q+r \leq 1.1$, $0 < r \leq 0.2$, $0 < q \leq 0.1$, and $5.9 \leq s \leq 6.1$;

$$M^2_2[Si_uF_v] \quad (Ib),$$

wherein in Formula (Ib), $M^2$ represents an alkali metal, and u and v satisfy $0.9 \leq u \leq 1.1$ and $5.9 \leq v \leq 6.1$.

15. The method of producing a fluoride phosphor according to claim 12, wherein the fluorine-containing substance comprises at least one selected from the group consisting of $F_2$, $CHF_3$, $CF_4$, $NH_4HF_2$, HF, $SiF_4$, $KrF_2$, $XeF_2$, $XeF_4$, and $NF_3$.

16. The method of producing a fluoride phosphor according to claim 14, wherein r and q satisfy $0 < r < 0.2$ and $0 < q < 0.1$.

* * * * *